United States Patent
Kamoi

(10) Patent No.: US 9,569,632 B2
(45) Date of Patent: Feb. 14, 2017

(54) INFORMATION PROCESSING APPARATUS HAVING WIRELESS COMMUNICATION FUNCTION AND METHOD OF CONTROLLING THE APPARATUS

(71) Applicant: CANON KABUSHIKI KAISHA, Tokyo (JP)

(72) Inventor: Keiko Kamoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/691,140

(22) Filed: Nov. 30, 2012

(65) Prior Publication Data

US 2013/0141753 A1   Jun. 6, 2013

(30) Foreign Application Priority Data

Dec. 2, 2011   (JP) .................................. 2011-264635

(51) Int. Cl.
*G06F 21/62* (2013.01)
*G06F 21/60* (2013.01)
(Continued)

(52) U.S. Cl.
CPC ........... *G06F 21/608* (2013.01); *G06F 3/1231* (2013.01); *G06F 3/1285* (2013.01); *G06F 3/1288* (2013.01); *G06F 21/629* (2013.01); *G06F 21/6218* (2013.01); *G06F 21/85* (2013.01); *G06K 15/4045* (2013.01); *G06K 15/4095* (2013.01); *H04N 1/00209* (2013.01); *H04N 1/4413* (2013.01); *H04N 1/4433* (2013.01); *H04W 12/02* (2013.01); *G06F 3/1204* (2013.01); *G06F 3/1222* (2013.01); *G06F 3/1236* (2013.01);

(Continued)

(58) Field of Classification Search
CPC ............ G06K 15/4095; G06K 15/4045; G06F 3/1222; G06F 3/1238; G06F 3/1231; G06F 3/1285; G06F 3/1288; G06F 21/629; G06F 21/608; G06F 21/6218; G06F 21/85; G06F 2221/2141; G06F 3/1204; G06F 3/1236; G06F 3/1292; H04N 1/00209; H04N 1/4413; H04N 1/4433; H04N 2201/0055; H04N 2201/0082

See application file for complete search history.

(56) References Cited

U.S. PATENT DOCUMENTS 8,638,459 B2 * 1/2014 Park .............................. 358/1.15
2002/0178365 A1 * 11/2002 Yamaguchi ................... 713/182
(Continued)

FOREIGN PATENT DOCUMENTS

CN      101841615 A    9/2010
JP      2004-227496 A  8/2004
(Continued)

*Primary Examiner* — Theodore C Parsons
(74) *Attorney, Agent, or Firm* — Canon U.S.A., Inc. IP Division

(57) ABSTRACT

An image forming apparatus that is wirelessly connectable with an external device receives a processing request from the external device via wireless communication, and performs processing corresponding to the processing request. A determination is made whether security settings used in the wireless communication satisfy a predetermined condition, and if the security settings do not satisfy the condition, a security level in the image forming apparatus is set to a predetermined level.

11 Claims, 12 Drawing Sheets

(51) Int. Cl.
*G06F 3/12* (2006.01)
*G06K 15/00* (2006.01)
*G06F 21/85* (2013.01)
*H04W 12/02* (2009.01)
*H04N 1/00* (2006.01)
*H04N 1/44* (2006.01)

(52) U.S. Cl.
CPC .......... *G06F 3/1238* (2013.01); *G06F 3/1292* (2013.01); *G06F 2221/2141* (2013.01); *H04N 2201/0055* (2013.01); *H04N 2201/0082* (2013.01); *H04N 2201/0094* (2013.01)

(56) References Cited

U.S. PATENT DOCUMENTS

| | | | | |
|---|---|---|---|---|
| 2003/0014625 | A1* | 1/2003 | Freed et al. | 713/153 |
| 2005/0055547 | A1* | 3/2005 | Kawamura | 713/155 |
| 2007/0095902 | A1* | 5/2007 | Fukasawa | G06F 21/445 235/382 |
| 2010/0100930 | A1* | 4/2010 | King | H04L 63/1433 726/1 |
| 2010/0104099 | A1* | 4/2010 | Kim | 380/270 |
| 2011/0080609 | A1* | 4/2011 | Park | H04L 12/5692 358/1.15 |
| 2011/0231902 | A1* | 9/2011 | Nagasaki | H04L 41/0806 726/3 |
| 2013/0024542 | A1* | 1/2013 | Keller | G05B 19/0428 709/217 |

FOREIGN PATENT DOCUMENTS

| | | |
|---|---|---|
| JP | 2005-085090 A | 3/2005 |
| JP | 2006-287600 A | 10/2006 |
| JP | 2007-083440 A | 4/2007 |
| JP | 2007-087002 A | 4/2007 |
| JP | 2008219750 A | 9/2008 |
| JP | 2009-194866 A | 8/2009 |

* cited by examiner

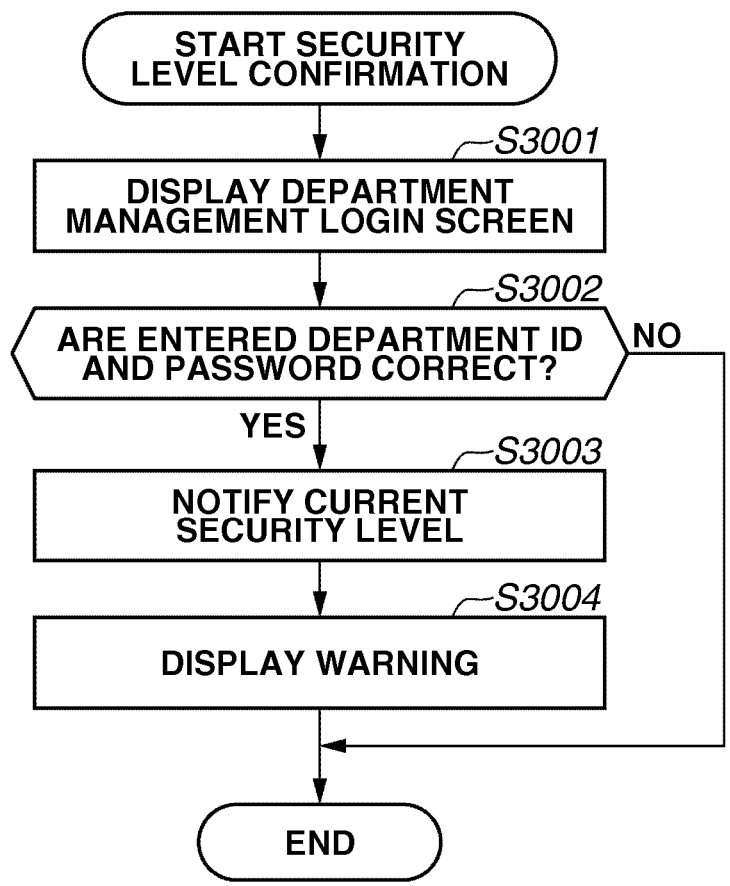

FIG.10

| DEPARTMENT NAME | DEPARTMENT A | DEPARTMENT B | DEPARTMENT C |
|---|---|---|---|
| SECURITY LEVEL | HIGH | MIDDLE | LOW |
| WRITE RESTRICTION TARGET ITEM | ADDRESS BOOK<br><br>SYSTEM MANAGEMENT INFORMATION<br><br>MIB OBJECT | ADDRESS BOOK<br><br>SYSTEM MANAGEMENT INFORMATION | ADDRESS BOOK |

INFORMATION PROCESSING APPARATUS HAVING WIRELESS COMMUNICATION FUNCTION AND METHOD OF CONTROLLING THE APPARATUS

BACKGROUND

Field of the Disclosure

Aspects of the present invention generally relate to an information processing apparatus having a wireless communication function such as a wireless local area network (LAN) function, and a method of controlling the apparatus. More particularly, the aspects of the present invention relate to a method of preventing information leakage in the information processing apparatus.

Description of the Related Art

Information processing apparatuses include, for example, image forming apparatuses such as copying machines, printers, and facsimile apparatuses. In recent years, some of the image forming apparatuses are provided with a wireless communication function such as a wireless LAN function. The use of a wireless LAN can eliminate wiring of cables, and the like. This enables, for example, a user to use the image forming apparatus via an external device such as a personal computer (PC) provided outside a building where the user stays. Further, data in the image forming apparatus can be read or written from the external device.

As described above, the use of the wireless LAN enables the user to access the image forming apparatus from the external device without installing wiring. Unfortunately, this also enables a user not expected by an administrator to access the image forming apparatus. To prevent the unexpected access, for example, when the user tries to access the image forming apparatus using the wireless LAN, authentication with a Wired Equivalent Privacy (WEP) key or a Wi-Fi Protected Access (WPA) key is performed.

Meanwhile, a connection by a wireless LAN without such authentication is provided (hereinafter, referred to as an authentication free wireless connection). The use of the authentication free wireless connection might cause improper use of the image forming apparatus from an unspecified number of external devices (for example, a PC), and then, a print job, or the like can be improperly executed.

Especially, if data in the image forming apparatus is accessed using a browser of the external device, even if the user does not stay at an installation site of the image forming apparatus, the user can view an address book recorded in the image forming apparatus and further edit the address book.

In the authentication free wireless connection state, external devices within the area where a wireless connection to the image forming apparatus can be allowed can access the image forming apparatus. As a result, the private information such as the address book recorded in the image forming apparatus can be stolen by the unspecified number of external devices.

Japanese Patent Application Laid-Open No. 2005-85090 discusses a method of restricting remote access to an information processing apparatus such as an image forming apparatus. In the method, in the first access, authentication is performed using user setting information set by an administrator.

In this method, after the authentication for the first access becomes successful, the image forming apparatus acquires device identification information that is specific to the external device, and registers the information in a memory, or the like. In the subsequent accesses, the image forming apparatus determines whether an access right is given to the external device using a combination of the user setting information and the device identification information. The external device determined to have the access right can issue various types of processing requests to the image forming apparatus via the wireless LAN.

In Japanese Patent Application Laid-Open No. 2005-85090, for the user setting information, a user name and a user ID, a password, or the like are used, and for the device identification information, a Media Access Control (MAC) address and an Internet Protocol (IP) address, or the like are used.

In such a system configuration, if the device identification information (device-specific information) of the external device is changed, the device identification information needs to be registered again. Further, even if the external device is connected by a wire such as a wired LAN, and even if it is clear that the device is a highly reliable external device placed near the image forming apparatus, the device identification information needs to be registered. Consequently, the image forming apparatus is not so much user-friendly.

SUMMARY

Aspects of the present invention relate to a user-friendly information processing apparatus capable of surely preventing improper access and a method of controlling the information processing apparatus.

According to an aspect of the present invention, an information processing apparatus that communicates with an external device includes a setting unit configured to set wireless communication settings for wirelessly communicating with the external device, a determination unit configured to determine whether the wireless communication settings include a security setting for encrypting data transmitted between an access point and the information processing apparatus, and a control unit configured to, if the determination unit determines that the wireless communication settings do not include the security setting, restrict access to the data in the information processing apparatus from the external device.

According to exemplary embodiments of the present invention, improper access from an external device can be prevented, and a user-friendly security can be provided.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3A illustrates a setting item screen for a network setting. FIG. 3B illustrates a wireless LAN setting screen. FIG. 3C illustrates a Service Set Identifier (SSID) list screen. FIG. 3D illustrates a connection permission screen. FIG. 3E illustrates a connection completion screen.

FIG. 4A illustrates a wireless LAN setting screen. FIG. 4B illustrates a security level setting screen. FIG. 4C illustrates a security level detail display screen. FIG. 4D illustrates a security level setting completion screen. FIG. 4E illustrates a connection confirmation screen.

FIG. 7 is a flowchart illustrating processing for displaying a current security level in the image forming apparatus in FIG. 1.

FIG. 8A illustrates a department management login screen. FIG. 8B illustrates a screen displayed after login on the operation panel.

FIG. 10 illustrates a department registration management table stored in the image forming apparatus in FIG. 1.

DESCRIPTION OF THE EMBODIMENTS

Various exemplary embodiments, features, and aspects of the invention will be described in detail below with reference to the drawings.

Figure 1:
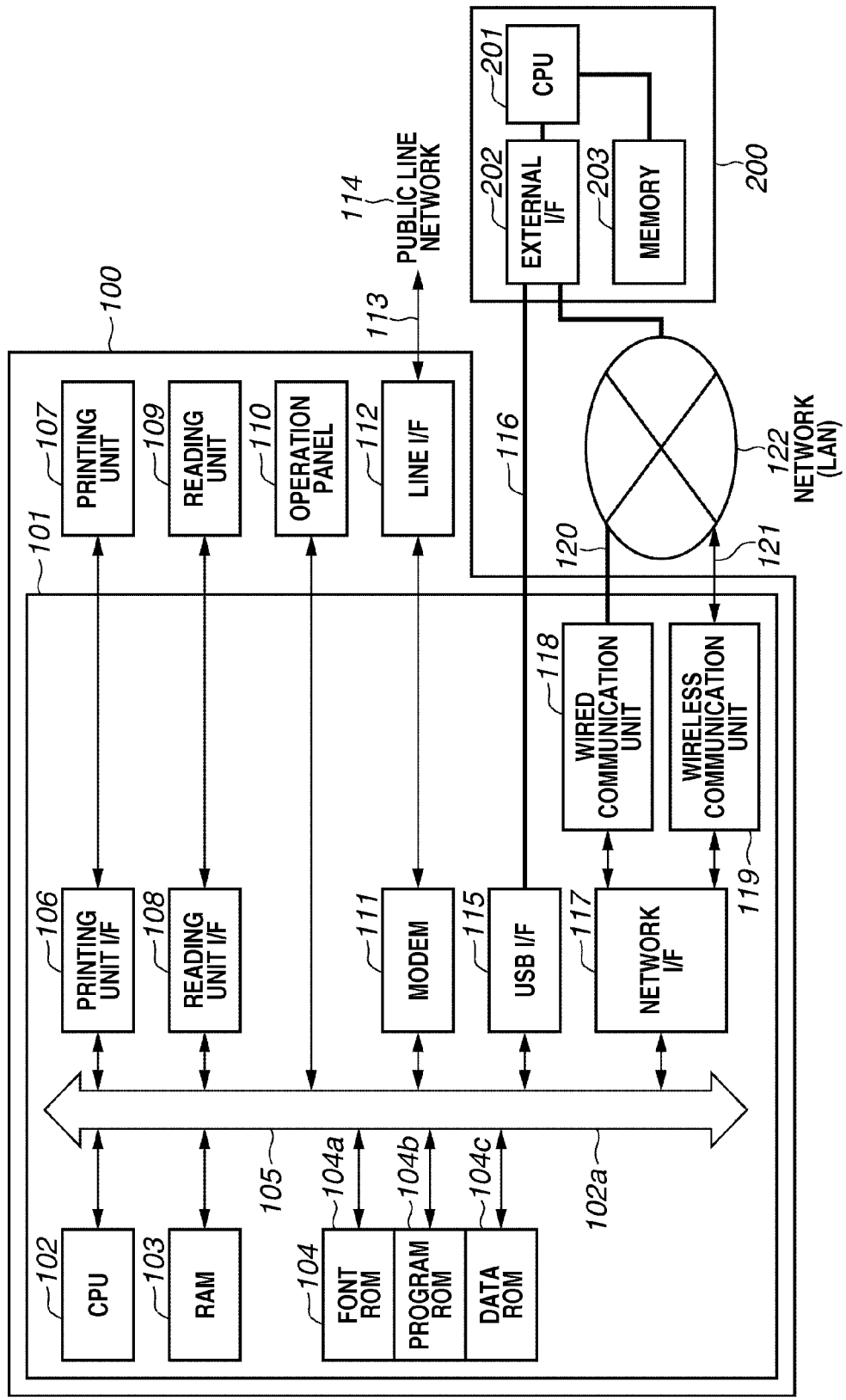
FIG. 1 is a block diagram illustrating a hardware configuration of an image forming apparatus that is an example of image processing apparatuses according to an exemplary embodiment.

FIG. 1 is a block diagram illustrating a hardware configuration of an image forming apparatus that is an example of the image processing apparatuses according to an exemplary embodiment.

The information processing apparatuses include image forming apparatuses such as printers and multifunction peripherals (MFPs). An image forming apparatus 100 in FIG. 1 includes a control unit 101, a printing unit (printer engine) 107, a reading unit (scanner unit) 109, an operation panel 110, and a line interface (I/F) 112. The control unit 101 includes a central processing unit (CPU) 102, a random access memory (RAM) 103, a read-only memory (ROM) unit 104, a modem (MODEM) 111, a wired communication unit 118, and a wireless communication unit 119.

As illustrated in the drawing, the CPU 102, the RAM 103, the ROM unit 104, the operation panel 110, and the MODEM 111 are connected to a system bus 105. The printing unit 107 and the reading unit 109 are connected to the system bus 105 via a printing unit I/F 106 and a reading unit I/F 108, respectively.

Further, to the system bus 105, a USB I/F 115 is connected. Via a network I/F 117, the wired communication unit 118 and the wireless communication unit 119 are connected to the system bus 105.

The ROM 104 is, for example, Electrically Erasable Programmable ROM, and the ROM 104 includes a font ROM 104a, a program ROM 104b, and a data ROM 104c.

The font ROM 104a stores font information. The program ROM 104b stores various types of programs. The data ROM 104c stores setting information such as device information about the image forming apparatus 100, telephone book information of a user, and department management information.

The wired communication unit 118 is connected to a network (LAN) 122 with a communication cable 120 such as a LAN cable. Meanwhile, the wireless communication unit 119 is connected to the network 122 via wireless communication (a wireless line or a wireless access point).

In the example in FIG. 1, to the network 122, a host computer 200 that is an external device is connected with a wire. Although not illustrated in FIG. 1, a terminal device that is an external device is connected to the image forming apparatus via a wireless line or a wired line. The host computer 200 is connectable to a USB I/F 115 via a USB cable 116. The host computer 200 and the terminal device access the image forming apparatus and issue a processing request.

The MODEM 111 is connected to a public line network 114 via the line I/F 112. The MODEM 111 communicates with another image forming apparatus, a facsimile machine, a telephone (not illustrated), or the like under the control of the CPU 102. The line I/F 112 and the public line network 114 are connected via a telephone line 113, or the like.

The CPU 102 controls the image forming apparatus 100 according to various kinds of control programs stored in the program ROM 104b. To execute the various kinds of control programs, the control program is loaded into the RAM 103 from the program ROM 104b. The various kinds of control programs can be stored in a hard disk drive (HDD) (not illustrated). The CPU 102 reads and updates the setting information as necessary.

The printing unit I/F 106 is used to output image data from the CPU 102 to the printing unit 107. The CPU 102 displays characters or symbols on a display unit of the operation panel 110 using the font information stored in the font ROM 104a. Further, the CPU 102 performs processing corresponding to instruction information received via the operation panel 110.

The reading unit I/F 108 is used to input image data acquired as a result of document reading processing performed by the reading unit 109. The CPU 102 performs predetermined processing on the image data input from the reading unit I/F 108, and outputs the data as print data to the printing unit I/F 106.

The host computer 200 that is an external device includes a CPU 201, an external I/F 202, and a memory 203. The CPU 201 performs control of the host computer 200. The host computer 200 is connected to the USB I/F 115 and the network 122 via the external I/F 202. The CPU 201 stores various types of data received via the external I/F 202 in the memory 203, and temporarily stores data such as job data (for example, image data) to be transmitted via the external I/F 202 in the memory 203.

Figure 2:
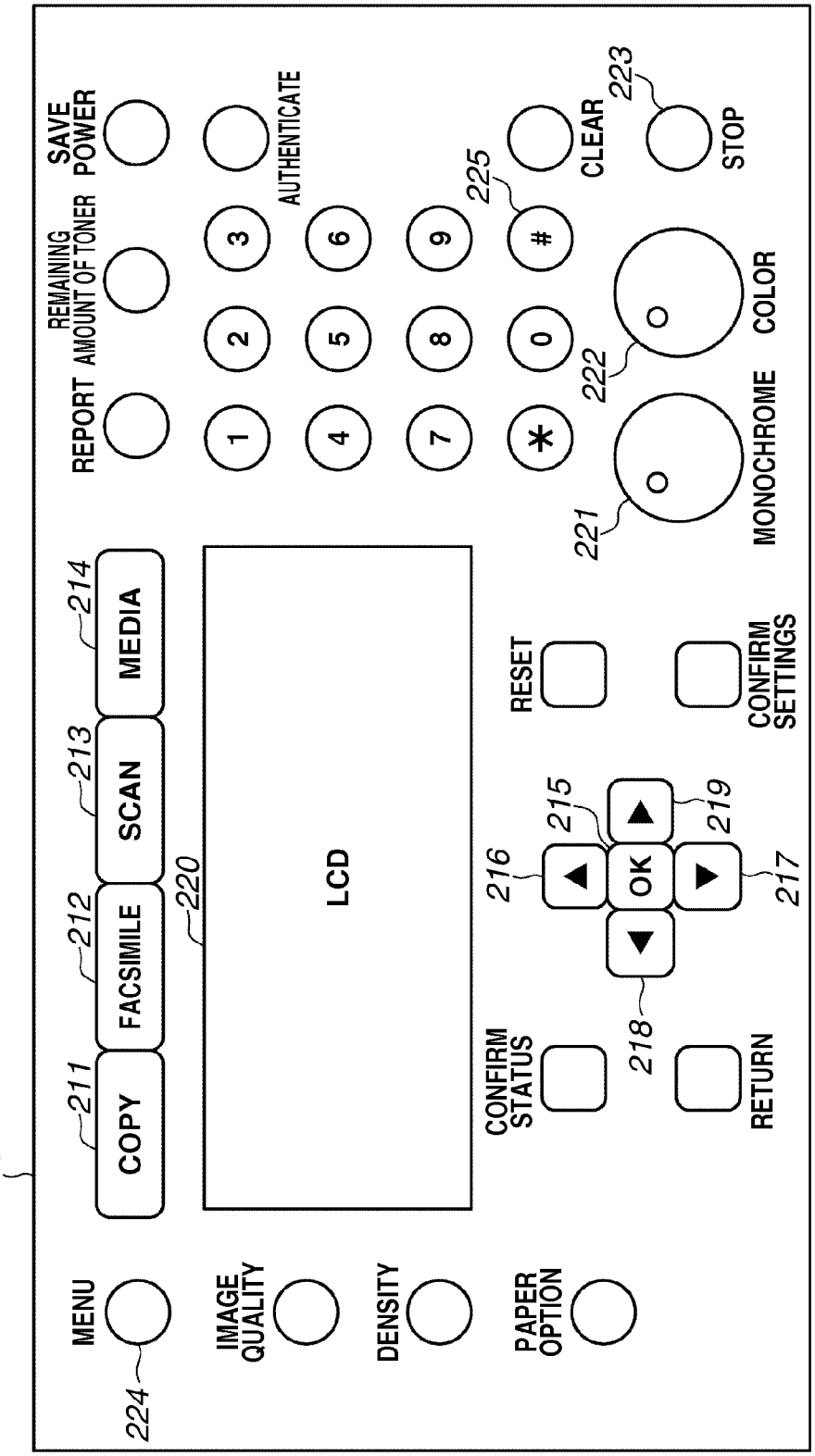
FIG. 2 illustrates an example of an operation panel in FIG. 1.

FIG. 2 illustrates an example of the operation panel 110 in FIG. 1.

In FIG. 2, the operation panel 110 includes a display unit (a liquid crystal display (LCD)) 220. On the display unit 220, for example, a setting status and a status of the image forming apparatus 100 are displayed. Arrow keys 216 to 219 are used to move a cursor or the like displayed on the display unit 220. At the center of the arrow keys 216 to 219, an OK key 215 is disposed. When the user presses the OK key 215, a response to a setting or an inquiry is determined.

The operation panel 110 further includes a menu key 224. The menu key 224 is pressed when the user wants to display a menu on the display unit 220. The user selects a desired menu item from the menu displayed on the display unit 220. For example, when the user performs a network setting described below, the user presses the menu key 224.

The operation panel 110 further includes function keys 211 to 214 used to select a function from copying, faxing, scanning, and media printing functions. The user presses one of the function keys 211 to 214 to execute the processing corresponding to the selected function.

For example, if the user wants to change a copy setting (paper size), the user presses the function key 211. In response to the pressing operation, the CPU 102 displays a copying function screen on the display unit 220. The user selects the item (paper size) to be changed using the arrow keys 216 to 219, and presses the OK key 215. By the operation, the CPU 102 displays a selectable setting screen on the display unit 220. Further, the user moves the cursor to a desired set position using the arrow keys 216 to 219 and presses the OK key 215, and thereby the copy setting is determined.

The operation panel 110 further includes a monochrome start key 221, a color start key 222, and a stop key 223. The monochrome start key 221 and the color start key 222 are pressed to execute monochrome printing and color printing, respectively. The monochrome start key 221 and the color start key 222 light in a state where the keys can be pressed. In facsimile transmission, only the monochrome start key 221 lights. The stop key 223 is pressed to stop a job such as a print job.

Figure 3A:
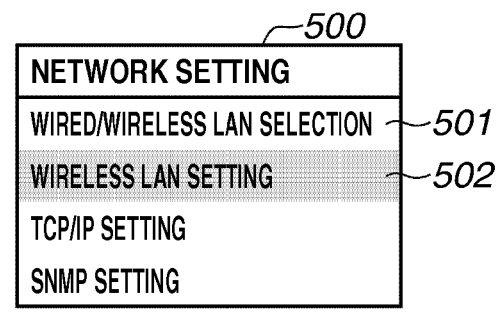
FIGS. 3A, 3B, 3C, 3D, and 3E illustrate screen transfer in selecting a network setting that is one of menu items displayed on the operation panel in FIG. 2.
Figure 3B:
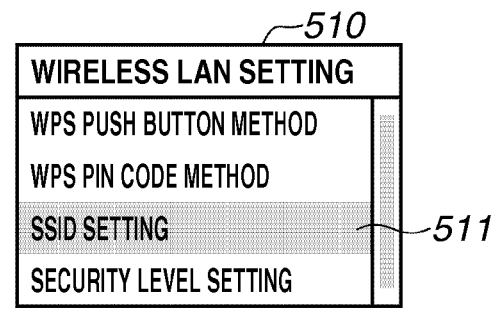
Figure 3C:
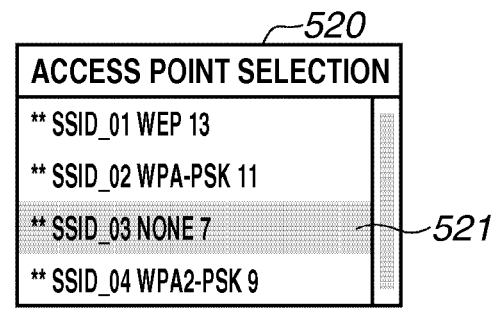
Figure 3D:
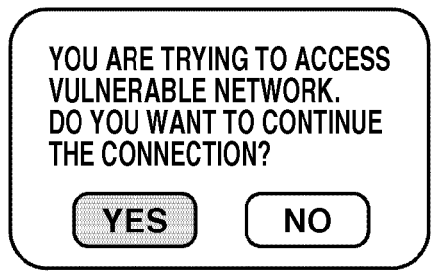
Figure 3E:
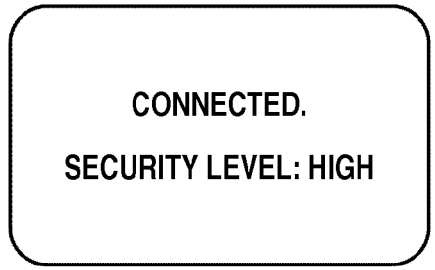

FIGS. 3A to 3D illustrate an example of screen transition performed when the user selects a network setting that is one of the menu items displayed on the operation panel 110 in FIG. 2. FIG. 3A illustrates a setting item screen for the network setting. FIG. 3B illustrates a wireless LAN setting screen. FIG. 3C illustrates an SSID list screen. FIG. 3D illustrates a connection permission screen. FIG. 3E illustrates a connection completion screen.

When the user performs the network setting in the image forming apparatus 100, the user presses the menu key 224 on the operation panel 110. By the operation, the CPU 102 displays the menu screen on the display unit 220. On the menu screen, various kinds of setting items are displayed. The user selects the network setting that is one of the setting items on the menu screen, and presses the OK key 215. In response to the pressing operation of the OK key 215, the CPU 102 displays the network setting screen 500 illustrated in FIG. 3A on the display unit 220.

In FIG. 3A, the title "NETWORK SETTING" is displayed, and a plurality of network setting items are displayed. In the example in FIG. 3A, as the network setting items, "WIRED/WIRELESS LAN SELECTION", "WIRELESS LAN SETTING", "Transmission Control Protocol/Internet Protocol (TCP/IP) SETTING", and "Simple Network Management Protocol (SNMP) SETTING" are displayed.

For example, using the wired/wireless LAN selection 501, the network connection configuration can be changed. In other words, with the selection of the wired/wireless LAN selection 501, the image forming apparatus 100 is connected to the network 122 via the wired LAN or the wireless LAN. If the user selects the wireless LAN setting 502, the user can set detailed settings of the wireless LAN.

If the user selects the wireless LAN setting 502 on the network setting screen 500, the CPU 102 displays the wireless LAN setting screen 510 illustrated in FIG. 3B on the display unit 220. In the example in FIG. 3B, on the wireless LAN setting screen 510, as the setting items, "Wi-Fi Protected Set-up (WPS) PUSH BUTTON METHOD", "WPS personal identification number (PIN) CODE METHOD", "SSID SETTING", and "SECURITY LEVEL SETTING" are displayed.

If a wireless access point (AP) complying with auto configuration WPS is used, the connection can be made in the WPS push button method or the WPS PIN code method. Meanwhile, if a wireless AP not complying with WPS is used, the user is required to manually set wireless LAN setting parameters such as an SSID necessary for the connection with the wireless AP, a security mode, and a key. In this exemplary embodiment, the user manually sets the wireless LAN settings, and it is assumed that the user selects the SSID setting 511.

If the user selects the SSID setting 511 on the wireless LAN setting screen 510, the CPU 102 displays the SSID list screen 520 illustrated in FIG. 3C on the display unit 220. The SSID list screen shows a list of the SSIDs of the wireless APs detected by the CPU 102. On the SSID list screen 520, the title "ACCESS POINT SELECTION" is displayed. In the SSID list, an electromagnetic strength (received signal strength indicator (RSSI)), a channel, a security mode, and a SSID format are displayed.

In the example in FIG. 3C, in the image forming apparatus 100, as the security mode, one of "WEP", "WPA-PSK", "NONE", and "WPA2-PSK" can be set. If the user selects "NONE" 521 as the security mode, the image forming apparatus 100 can be connected by the wireless LAN without authentication.

It is assumed that the user selects the SSID of "NONE" 521 on the SSID list screen 520. In response to the selection, the CPU 102 displays the connection confirmation screen illustrated in FIG. 3D on the display unit 220 to warn the user that the image forming apparatus 100 is trying to connect to the network without authentication, that is, to the vulnerable network. If a security mode other than "NONE" is selected, the CPU 102 displays a connection completion screen like the screen illustrated in FIG. 3E on the display unit 220 without displaying the connection confirmation screen.

If the user selects "YES" on the connection confirmation screen, the CPU 102 displays the connection completion screen illustrated in FIG. 3E. If the user selects "NONE (authentication free)" as the security mode, the CPU 102, as described below, automatically sets the security level to a high level, and displays a message indicating that an access restriction is imposed. In the example in FIG. 3E, the user is notified that the security level is set to the high level.

In wireless LAN connection in which the security level is set to a level other than "NONE", the security level illustrated in FIG. 3E is not displayed, and simply the message "CONNECTED." is displayed.

So far the security level "HIGH" is a predetermined level (a first level), and a security level "MIDDLE" is a second level. A security level "LOW" is a third level.

Figure 4A:
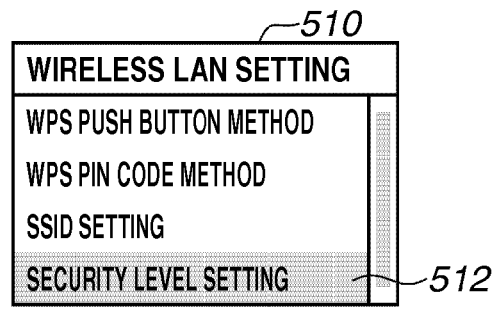
FIGS. 4A, 4B, 4C, 4D, and 4E illustrate another example of the screen transfer in selecting the network setting that is one of the menu items displayed on the operation panel in FIG. 2.
Figure 4B:
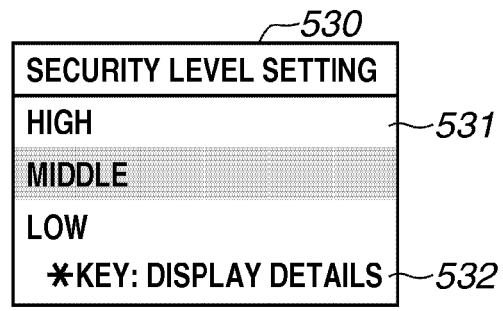
Figure 4C:
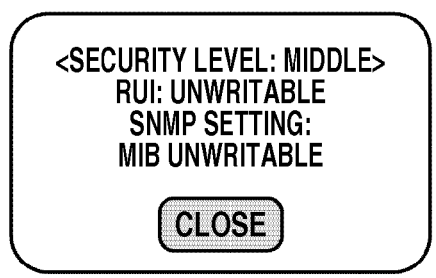
Figure 4D:
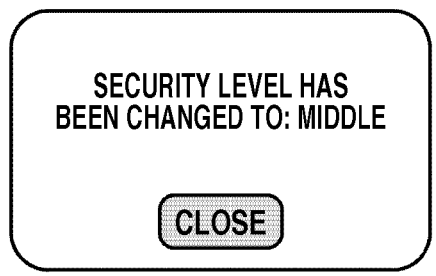
Figure 4E:
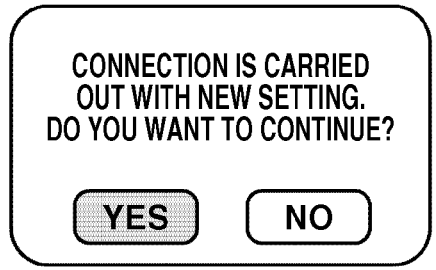

FIGS. 4A to 4E illustrate another example of the screen transition performed when the user selects the network setting that is one of the menu items displayed on the operation panel 110 in FIG. 2. FIG. 4A illustrates a wireless LAN setting screen. FIG. 4B illustrates a security level setting screen. FIG. 4C illustrates a security level detail display screen. FIG. 4D illustrates a security level setting completion screen. FIG. 4E illustrates a connection confirmation screen.

On the wireless LAN setting screen 510 in FIG. 4A, if the user selects "SECURITY LEVEL SETTING" 512, the CPU 102 displays the security level setting screen 530 illustrated in FIG. 4B on the display unit 220. On the security level setting screen 530, the security level 531 including three steps of "HIGH", "MIDDLE", and "LOW" can be set.

Further, on the security level setting screen 530, the "DISPLAY DETAILS" key 532 is displayed. If the user selects the key 532, the CPU 102 displays the security level detail display screen illustrated in FIG. 4C on the display unit 220. In the example in FIG. 4C, the security level setting screen 530 shows a security level detail display screen to be displayed when the cursor is set to the "MIDDLE" level, and the "DISPLAY DETAILS" key 532 is pressed.

In this exemplary embodiment, if the security level is set to "MIDDLE", when access to the data in the image forming apparatus 100 (that is, in the information processing apparatus) is tried from a browser or the like of an external device, write to the image forming apparatus 100 is disabled. Further, write to an SNMP setting by Management Information Bases (MIBs) is disabled. In other words, on the security level detail display screen, detailed restriction items restricted in the selected security level are displayed.

On the security level setting screen illustrated in FIG. 4B, when the user changes the security level, authentication described below is required.

In response to an pressing operation of the "CLOSE" key by the user on the security level detail display screen, if the security level has been changed, the CPU 102 displays the security level setting completion screen illustrated in FIG. 4D on the display unit 220. If the user presses the "CLOSE" key on the security level setting completion screen, the CPU 102 displays the connection confirmation screen illustrated in FIG. 4E on the display unit 220.

On the connection confirmation screen, if the user presses the "YES" key, the CPU 102 executes the wireless LAN connection.

Figure 5:
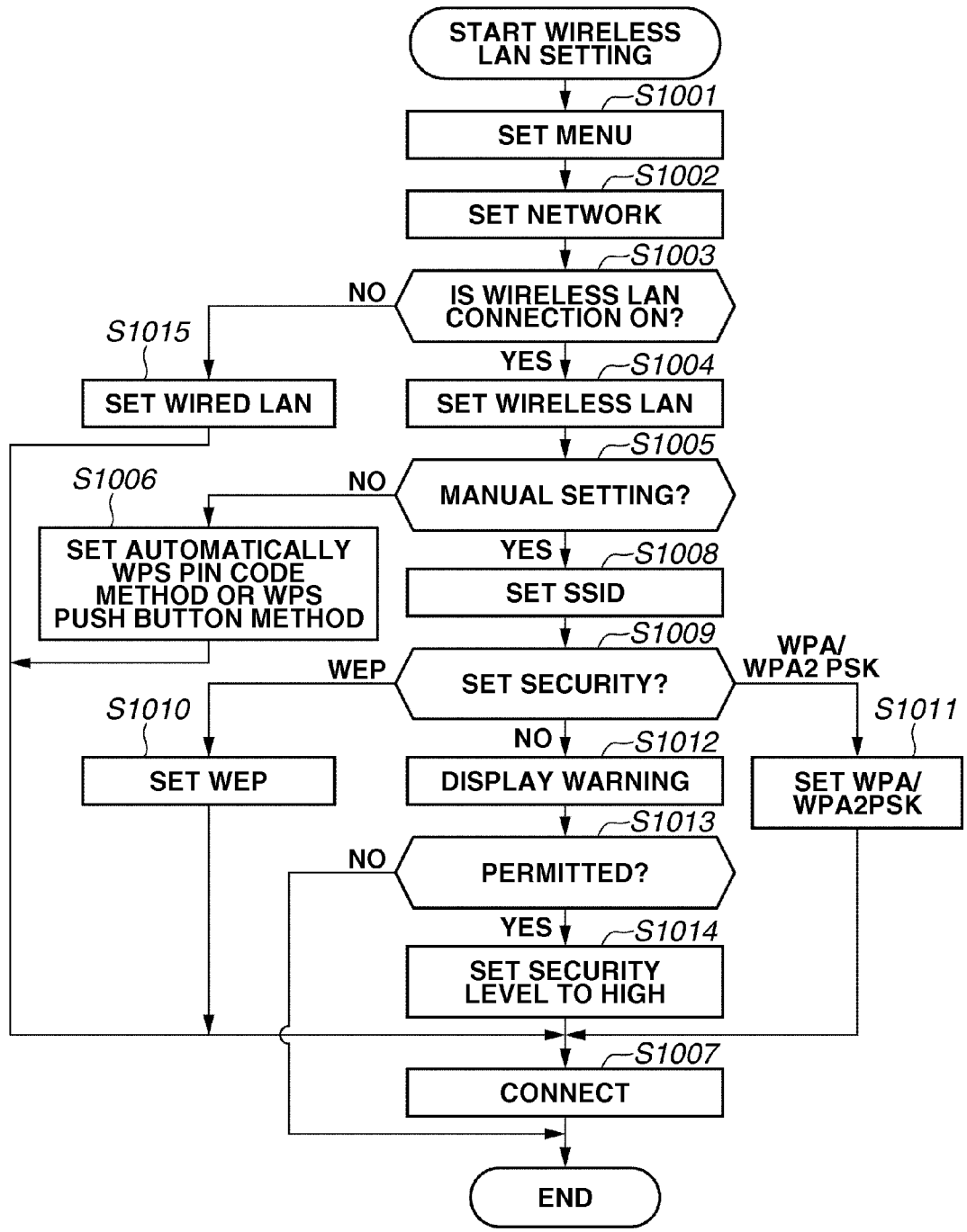
FIG. 5 is a flowchart illustrating wireless LAN setting processing in the image forming apparatus in FIG. 1.

FIG. 5 is a flowchart illustrating wireless LAN setting processing in the image forming apparatus 100 illustrated in FIG. 1.

With reference to FIGS. 1 and 5, in step S1001, if the user presses the menu key 224 on the operation panel 110, the CPU 102 displays the menu screen for performing the menu setting on the display unit 220. In step S1002, if the user selects the network setting from the network setting items displayed on the menu screen and presses the OK key 215, the CPU 102 displays the network setting screen on the display unit 220.

After the display of the network setting screen, in step S1003, the CPU 102 checks a current network connection configuration. In this processing, the CPU 102 checks whether the image forming apparatus 100 is connected to the network 122 via the wireless communication unit 119. In other words, the CPU 102 checks whether the network connection is implemented by wireless LAN (whether wireless LAN is ON). As described in FIG. 3A, the user can switch the wired LAN and the wireless LAN using the wired/wireless LAN selection 501.

If the wireless LAN is ON (YES in step S1003), the user can select the wireless LAN setting on the network setting screen 500. In step S1104, if the user selects the wireless LAN setting, the CPU 102 displays the wireless LAN setting screen 510 on the display unit 220. In step S1005, the CPU 102 determines which one of the wireless LAN automatic setting and manual setting is selected.

As described in FIG. 3, if the wireless AP complies with auto configuration WPS, the WPS push button method or the WPS PIN code method is selected. If the wireless AP not complying with WPS is used, the wireless LAN setting is to be manually set, and consequently, the SSID setting is selected.

If the automatic setting is selected (NO in step S1005), in step S1006, the CPU 102 automatically sets, for example, the WPS push button method or the WPS PIN code method. In step S1007, the CPU 102 executes the wireless LAN connection with the selected wireless LAN setting that is using the selected wireless AP, and ends the wireless LAN setting.

If the manual setting is selected (YES in step S1005), the CPU 102 displays the SSID list screen 520 on the display unit 220. In step S1008, in the SSID setting, as described in FIG. 3C, the user selects a desired SSID from the SSID list displayed on the SSID list screen 520.

Alternatively, the user can instruct the display unit 220 to display another SSID setting screen, and manually register a SSID. On the SSID setting screen, wireless LAN setting parameters such as an SSID, a security mode, and a key can be set. Similarly, in a case where a desired SSID is selected from the SSID list, the wireless LAN setting parameters such as the SSID, the security mode, and the key can be viewed.

In step S1009, in the security setting, the CPU 102 determines the setting of the security level in the set SSID. In determining the setting of the security level, for example, the CPU 102 determines whether the wireless LAN setting is set to encrypt data between the access point and the image forming apparatus as in WEP and WPA/WPA2-PSK, or set to perform wireless communication without encrypting the data as in NONE.

If the security setting is set to WEP (WEP in step S1009), in step S1010, the CPU 102 performs the WEP setting. Then, the processing proceeds to step S1007, the CPU 102 executes the wireless LAN connection with the selected wireless LAN setting, and ends the wireless LAN setting.

If the security setting is set to WPA/WPA2-PSK (WPA/WPA2-PSK in step S1009), in step S1011, the CPU 102 performs WPA/WPA2-PSK. Then, the processing proceeds to step S1007 where the CPU 102 executes the wireless LAN connection with the selected wireless LAN setting, and ends the wireless LAN setting.

If the security setting is set to NONE (NO in step S1009), in step S1012, the CPU 102 displays the connection confirmation screen described in FIG. 3D on the display unit 220 to warn the user. Instep S1013, the CPU 102 confirms which one of "YES" button and "NO" button is pressed on the connection confirmation screen. If the "NO" button is pressed (NO instep S1013), the CPU 102 ends the wireless LAN setting.

If the "YES" button is pressed (YES in step S1013), the authentication free wireless LAN is selected, and consequently, in step S1014, the CPU 102 sets the security level to the high level. Then, the processing proceeds to step S1007 where the CPU 102 executes the wireless LAN connection with the selected wireless LAN setting, displays the connection completion screen described in FIG. 3E, and ends the wireless LAN setting.

In the example in FIG. 3E, if the security setting is set to "NONE", the security level is set to "HIGH". In other words, if the security setting does not satisfy the predetermined conditions, the CPU 102 forcibly changes the security level to "HIGH" that is the predetermined level.

In step S1003, if the wireless LAN is not ON (NO in step S1003), the CPU 102 determines that the network setting is set to wired LAN connection, that is, a wired LAN is being selected. In step S1015, the CPU 102 performs the wired LAN setting. Then, the processing proceeds to step S1007 where the CPU 102 executes network connection with the wired LAN setting, and ends the LAN setting.

Figure 6:
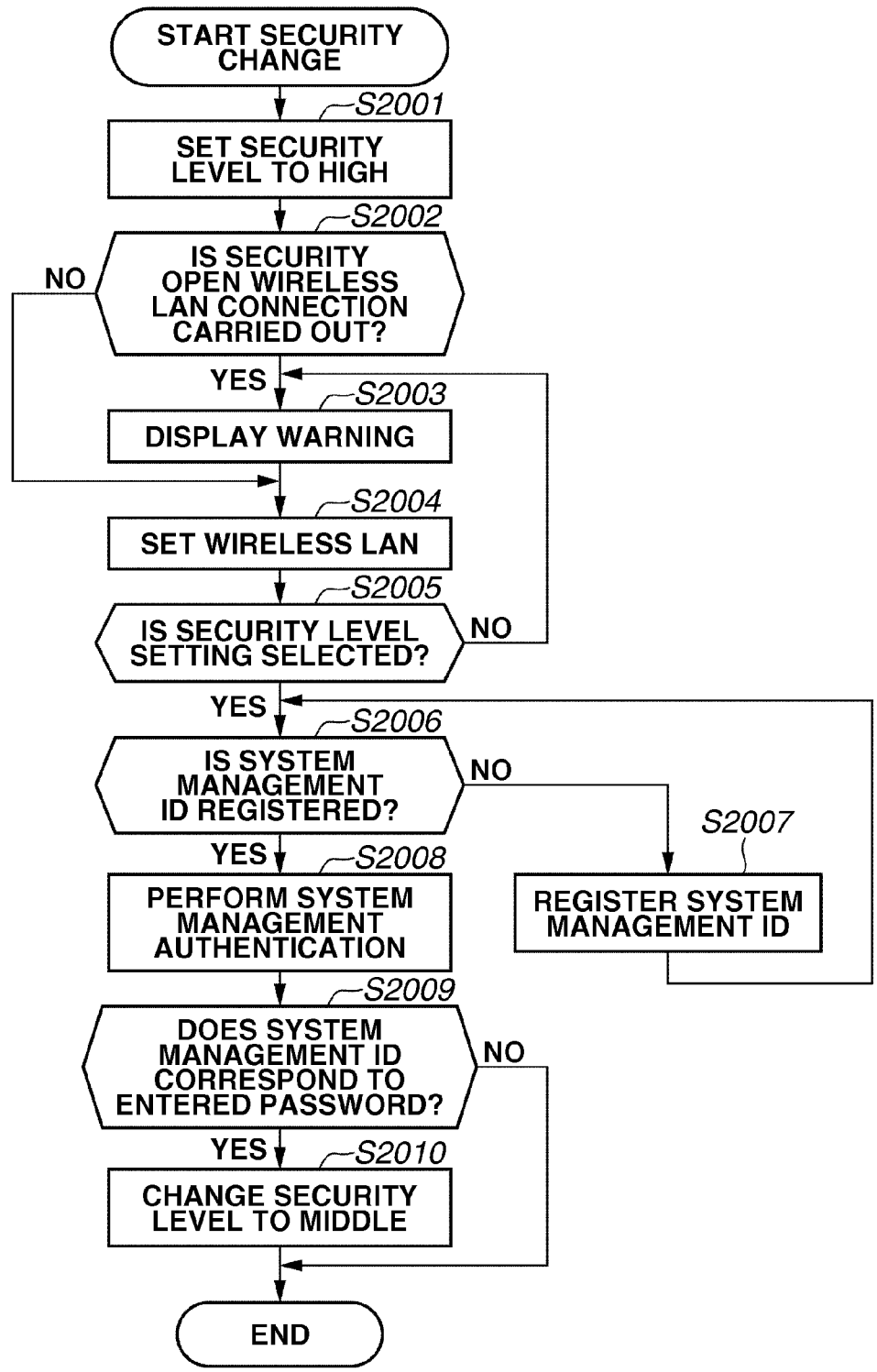
FIG. 6 is a flowchart illustrating security level changing processing in the image forming apparatus in FIG. 1.

FIG. 6 is a flowchart illustrating security level changing processing in the image forming apparatus 100 illustrated in FIG. 1. In this exemplary embodiment, the security level is changed from a "HIGH" setting to a "MIDDLE" setting.

With reference to FIGS. 1 and 6, it is assumed that the security level in the image forming apparatus 100 is set to "HIGH". In step S2001, the CPU 102 confirms that the security level is set to "HIGH". In step S2002, the CPU 102 determines whether the image forming apparatus 100 is connecting by a security open wireless LAN. A security open wireless LAN connection is a state where wireless LAN connection is being performed with the wireless AP whose security setting is set to NONE.

If the CPU 102 determines that the image forming apparatus 100 is connecting by the security open wireless LAN (YES in step S2002), in step S2003, the CPU 102 displays toggles for warning on the display unit 220. It is assumed that instep S2004, the user presses the menu key 224 on the operation panel 110 to select the network setting from the menu screen, and selects the wireless LAN setting. If the image forming apparatus 100 is not connecting by the security open wireless LAN (NO in step S2002), the processing proceeds to step S2004.

In step S2005, the CPU 102 determines that the security level setting is selected on the wireless LAN setting screen 510 in FIG. 3B or FIG. 4A. If the CPU 102 determines that the security level setting is not selected (NO in step S2005), the processing returns to step S2003, and the CPU 102 displays toggles for warning.

If the CPU 102 determines that the security level setting is selected (YES in step S2005), in step S2006, the CPU 102 confirms whether a system management ID and a password have been registered. The system management ID and the password are, for example, registered in the data ROM 104c illustrated in FIG. 1 in advance as a registered system management ID and a registered password.

If the system management ID is not registered (NO in step S2006), in step S2007, the CPU 102 displays a registration screen (not illustrated) on the display unit 220 to urge the user to newly register a system management ID. Then, the processing returns to the processing in step S2006.

If the system management ID has been registered (YES in step S2006), in step S2008, the CPU 102 performs system management authentication for confirming whether the registered password added to the registered system ID corresponds to the entered password. In step S2009, the CPU 102 determines whether the registered password associated with the registered system management ID corresponds to the entered password.

If the passwords do not correspond to each other, that is, the authentication failure occurs (NO in step S2009), the CPU 102 ends the security level changing processing. If the authentication is successfully performed (YES in step S2009), the CPU 102 permits the change in the security level on the security level setting screen illustrated in FIG. 4B. In the example in FIG. 4B, on the security level setting screen, the user changed the security level to "MIDDLE", and consequently, in step S2010, the CPU 102 changes the security level to "MIDDLE", and ends the processing for changing the security level.

Now, processing of displaying the current security level in the image forming apparatus 100 illustrated in FIG. 1 is described. It is assumed that, as described in FIG. 6, the security level has been changed from "HIGH" to "MIDDLE".

FIG. 7 is a flowchart illustrating the processing of displaying the current security level in the image forming apparatus 100 illustrated in FIG. 1. To the image forming apparatus 100, a setting (a department management setting) relating to departments managing the image forming apparatus 100 is performed.

Although not illustrated in the drawing, the department management setting is performed using the operation panel 110. In the department management setting, a department ID and its corresponding password are set as a set department ID and a set password, respectively. Further, in the department management setting, using the operation panel 110, the user can select enable (ON) or disable (OFF). The department management setting is registered, for example, in the data ROM 104c.

With reference to FIGS. 1 and 2, after the image forming apparatus 100 is turned on, if the department management setting is enabled, in step S3001, the CPU 102 displays a department management login screen on the display unit 220.

Figures 8A, 8B:
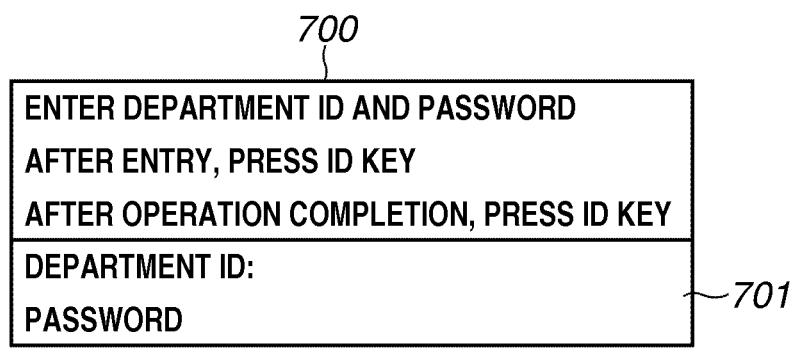
FIGS. 8A and 8B illustrate department management login screens displayed on the operation panel in FIG. 1.

FIGS. 8A and 8B illustrate the department management login screens displayed on the operation panel 110 illustrated in FIG. 1. FIG. 8A illustrates the department management login screen. FIG. 8B illustrates a screen displayed on the operation panel 110 after login.

A department management login screen 700 illustrated in FIG. 8A includes an entry field 701 for entering a department ID and a password. After entering a department ID and password, the user presses the OK key 215 illustrated in FIG. 2. In step S3002, in response to the pressing operation, the CPU 102 determines whether the set department ID and the set password correspond to the entered department ID and the password. In other words, the CPU 102 determines whether the entered management ID and the password are correct.

If the entered department ID and the password are not correct (NO in step S3002), the CPU 102 ends the display processing. If the entered department ID and the password are correct (YES in step S3002), in step S3003, the CPU 102 displays the security level confirmation screen illustrated in FIG. 8B on the display unit 220. On the security level confirmation screen, the current security level is displayed. In the example in FIG. 8B, a message indicating that the security level is "MIDDLE" is displayed.

On the security level confirmation screen, if the user presses the "CLOSE" button, in step S3004, displays toggles for warning indicating that the currently used wireless AP is an authentication free wireless AP on the display unit 220. Then, the CPU 102 ends the display processing.

Although not illustrated in FIG. 7, after the power is turned on, if the department management setting is disabled, the CPU 102 executes the processing in step S3003. In the example illustrated in FIG. 7, the security level is displayed. Alternatively, the current wireless connection state and security level can be displayed.

Figure 9:
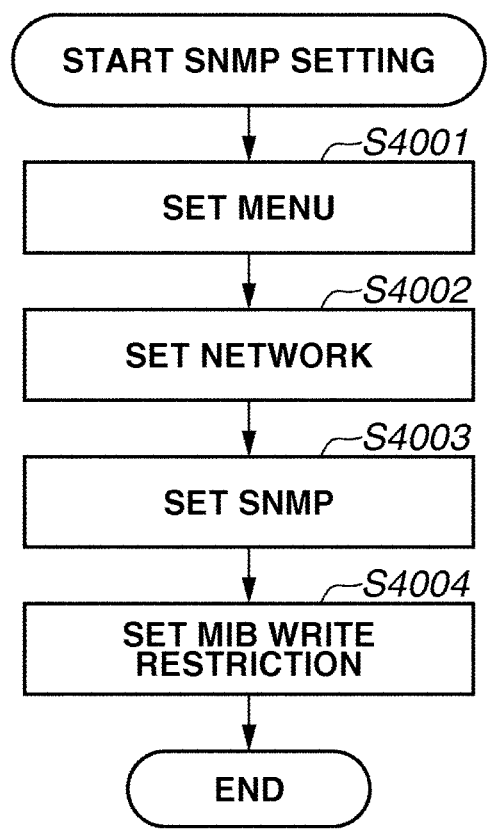
FIG. 9 is a flowchart illustrating an SNMP setting in the image forming apparatus in FIG. 1.

FIG. 9 is a flowchart illustrating the SNMP setting in the image forming apparatus in FIG. 1.

With reference to FIGS. 1 and 9, if the user presses the menu key 224 on the operation panel 110 illustrated in FIG. 2, the CPU 102 displays the menu screen on the display unit 220 in step S4001. On the menu screen, if the user selects the network setting that is a menu item, in step S4002, the CPU 102 displays the network setting screen 500 illustrated in FIG. 3A on the display unit 220.

On the network setting screen 500, if the user sets the cursor to the SNMP setting and presses the OK key 215, in step S4003, the CPU 102 displays an SNMP setting screen (not illustrated) on the display unit 220. On the SNMP setting screen, with respect to SNMPv1 (SNMP version 1) and SNMPv3 (SNMP version 3), they can be set as ON/OFF. Moreover, with respect to the setting information (also referred to as management information) that is managed in the image forming apparatus 100, it can be set as to whether the acquisition thereof is possible.

If the setting of SNMPv1 is ON, in step S4004, the CPU 102 displays a screen for performing setting of MIB access restriction (MIB object write restriction) on the display unit 220. After the completion of the setting of the MIB access restriction, the CPU 102 ends the SNMP setting.

The image forming apparatus 100 illustrated in FIG. 1 is used in a plurality of departments. In such a case, for each department, the user sets, for example, a security level and a write restriction target item via the operation panel 110, and registers the information as a department registration management table. The department registration management table is stored, for example, in the data ROM 104*c*.

FIG. 10 illustrates an example of the department registration management table stored in the image forming apparatus 100 illustrated in FIG. 1.

In the example in FIG. 10, as a name of department, three departments of departments A to C are set, and with respect to a security level, the department A is set to "HIGH", the department B is set to "MIDDLE", and the department C is set to "LOW".

As a write restriction target item, for the department A, address book, system management information, and MIB object are set. For the department B, address book and system management information are set as the write restriction target items. For the department C, address book is set as the write restriction target item.

Figure 11:
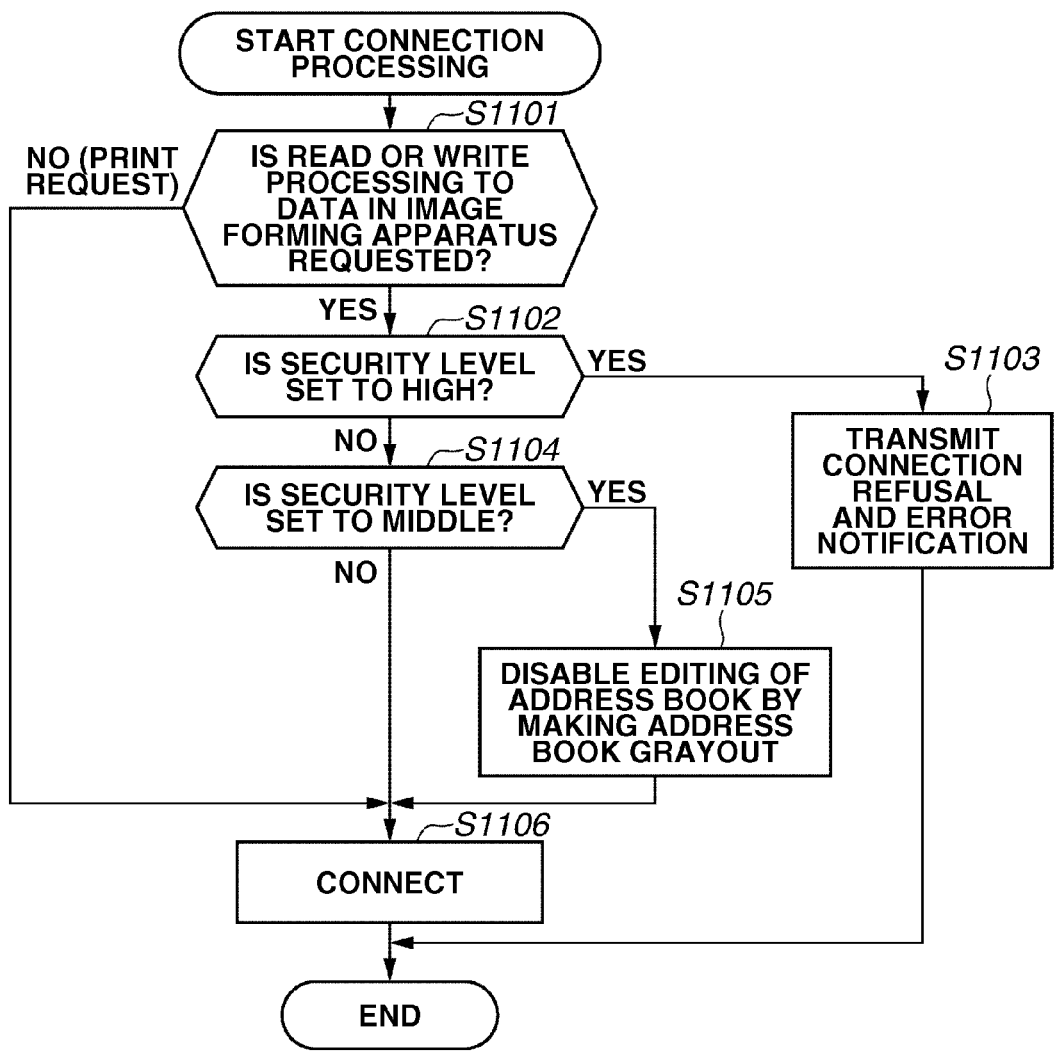
FIG. 11 is a flowchart illustrating processing performed when an address book is set as a write restriction target item to the image forming apparatus in FIG. 1.

FIG. 11 is a flowchart illustrating the processing performed when the image forming apparatus 100 receives a processing request from the external terminal device illustrated in FIG. 1.

With reference to FIGS. 1 and 11, it is assumed that, although not illustrated in FIG. 1, the image forming apparatus 100 receives a processing request from the terminal device via the wireless LAN.

If the CPU 102 receives the processing request from the terminal device via the wireless communication unit 119, in step S1101, the CPU 102 determines whether the received request is a read or write request to the data in the image forming apparatus 100. For example, the CPU 102 determines to which port of the image forming apparatus 100 the received request is transmitted.

If the CPU 102 determines that the decision is NO in step S1101, the processing proceeds to step S1106. The CPU 102 determines that the decision is NO in step S1101, for example, when the image forming apparatus 100 receives a print request from the external terminal device. If the image forming apparatus 100 receives the print request, in step S1106, the connection is permitted regardless of the set security level, and the print processing is executed.

If the CPU 102 determines that the decision is YES in step S1101, in step S1102, the CPU 102 confirms whether the security level of the image forming apparatus 100 is set to "HIGH". If the CPU 102 determines that the security level is set to "HIGH" (YES in step S1102), in step S1103, the CPU 102 transmits a connection refusal and an error notification to the terminal device via the wireless communication unit 119. By the operation, an access error is displayed on the display unit of the terminal device.

If the CPU 102 determines that the security level is not set to "HIGH" (NO in step S1102), in step S1104, the CPU 102 confirms whether the security level of the image forming apparatus 100 is set to "MIDDLE". If the security level is set to "MIDDLE" (YES in step S1104), the CPU 102 refers to the department registration management table and restricts write to the write restriction target item. It is assumed that the address book is set to the write restriction target item. In step S1105, for example, the CPU 102 makes the address book gray out to disable editing of the address book, and enables only reference (viewing) of the address book.

In step S1106, the CPU 102 permits connection to the terminal device to connect the image forming apparatus 100 therewith by wireless LAN to enable the access. Then, the CPU 102 ends the connection processing.

If the security level is not set to "MIDDLE" (NO in step S1104), the processing proceeds to step S1106. In step S1106, the CPU 102 permits the connection of the terminal device with the image forming apparatus 100, and executes the data processing according to the request received in step S1101.

For example, if the received processing request is to read the data (for example, the device information about the image forming apparatus 100, the telephone book information of the user, and the department management information) in the image forming apparatus 100, the CPU 102 reads the data according to the request from the data ROM 104*c*, and transmits the data to the terminal device of a request source.

If the received processing request is to write data in the storage device in the image forming apparatus 100, the CPU 102 writes the data received together with the processing request in the data ROM 104*c* in the image forming apparatus. If the received request is to instruct the printing unit 107 in the image forming apparatus 100 to print data, the CPU 102 performs the print processing according to the data received together with the processing request.

As described above, in the exemplary embodiment, in a case where a processing request received from an external terminal device is a request for reading data in the image forming apparatus or writing data, and wireless LAN setting is performed without authentication, the security level is forcibly set to "HIGH" to reject the received processing request. With the configuration, improper access from a vulnerable network can be prevented.

In the department registration management table in FIG. 10, to the department C, the security level "LOW" is set, and the address book is set as the write restriction target item. In such a case, in setting the write restriction target item, since the security level is "LOW", the CPU 102 displays a warning indicating that the write restriction target item is to be ignored on the display unit 220.

Figure 12:
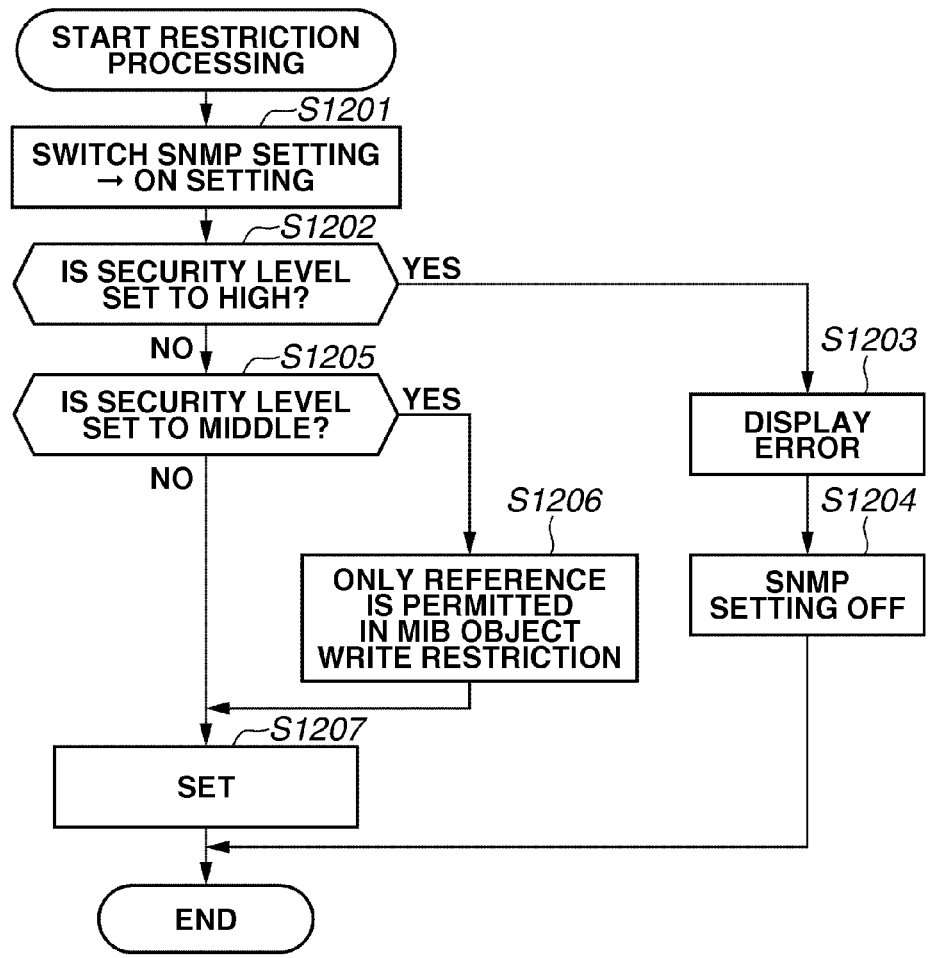
FIG. 12 is a flowchart illustrating MIB object write restriction processing performed when acquisition of the management information is restricted in the image forming apparatus in FIG. 1.

FIG. 12 is a flowchart illustrating MIB object write restriction processing performed when acquisition of the management information is restricted in the image forming apparatus 100 in FIG. 1.

With reference to FIGS. 1 and 12, in step S1201, the user changes the SNMP setting from disable (OFF) to enable (ON) as described above using the operation panel 110. In step S1202, the CPU 102 confirms whether the security level of the image forming apparatus 100 is set to "HIGH". If the security level is set to "HIGH" (YES in step S1202), in step S1203, the CPU 102 displays an error on the display unit 220. In step S1204, the CPU 102 disables (OFF) the SNMP setting, and ends the processing.

If the CPU 102 determines that the security level is not set to "HIGH" (NO in step S1202), in step S1205, the CPU 102 confirms whether the security level of the image forming apparatus 100 is set to "MIDDLE". If the security level is set to "MIDDLE" (YES in step S1205), in step S1206, the CPU 102 permits only reference to the MIB object write restriction. In step S1207, the CPU 102 sets the information to the ROM 104c. Then, the CPU 102 ends the processing.

If the CPU 102 determines that the security level is set to "LOW" (NO in step S1205), the processing proceeds to step S1207. In step S1207, the CPU 102 permits only editing of the MIB object write restriction, and sets the setting. Then, the CPU 102 ends the processing.

As described above, in the exemplary embodiment, the setting of access restriction can be made for each department, and depending on the network connection configuration, the restriction on access from an external device such as a terminal device can be switched. As a result, the usability for users can be increased.

Further, in the exemplary embodiment, if the image forming apparatus is connected to the external device by the wireless LAN without authentication, which has a high risk in leakage of secret private information, the security level is automatically switched to the high level. As a result, information leakage due to improper access from the external device can be surely prevented.

As will be understood from the description above, in the example in FIG. 1, the CPU 102 and the operation panel 110 function as a setting unit. The CPU 102 also functions as a first determination unit, a second determination unit, and a control unit. The CPU 102 and the operation panel 110 function as an inquiry unit and a changing unit.

In the above-described exemplary embodiment, the image forming apparatus is described as an example of the information processing apparatus. Alternatively, information processing apparatuses other than the image forming apparatus, for example, a computer used from an external device by wireless communication can be similarly used.

While the present invention has been described with reference to the exemplary embodiments, it is to be understood that the invention is not limited to the disclosed exemplary embodiments, various modifications can be made without departing from the scope of the disclosure.

For example, the functions according to the above-described exemplary embodiments can be implemented as a control method and the control method can be executed by an information processing apparatus. Alternatively, a program having the functions according to the above-described exemplary embodiments can be implemented as a control program and the control program can be executed by a computer included in the information processing apparatus. The control program is recorded, for example, in a computer-readable recording medium.

In such a case, each of the control method and the control program includes at least a setting step, a first determination step, a second determination step, and a control step.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-264635 filed Dec. 2, 2011, which is hereby incorporated by reference herein in its entirety.

What is claimed is:

1. A printing apparatus that performs wireless communication by establishing a connection to an access point, the printing apparatus comprising:
   a determination unit configured to determine whether the access point connected by the printing apparatus is an authentication-free access point or not; and
   a setting unit configured to set a predetermined security setting into the printing apparatus upon determination by the determination unit that the access point connected by the printing apparatus is an authentication-free access point, the predetermined security setting being a setting of at least prohibiting an external apparatus from acquiring management information managed by the printing apparatus,
   wherein, even if the predetermined security setting is set in the printing apparatus, the printing apparatus performs print processing on the basis of a print request received from the external apparatus.

2. The printing apparatus according to claim 1, wherein the management information is any one of department management information and telephone book information.

3. The printing apparatus according to claim 1, wherein the predetermined security setting is a setting of further prohibiting the external apparatus from changing the management information.

4. The printing apparatus according to claim 1, wherein the determination unit determines that the access point connected by the printing apparatus is an authentication-free access point in a case where the access point connected by the printing apparatus has been set not to perform encryption of data communication between the access point and the printing apparatus.

5. The printing apparatus according to claim 4, wherein the encryption conforms to an encryption scheme of any of WEP, WPA, and WPA2-PSK.

6. A method of controlling a printing apparatus that performs wireless communication by establishing a connection to an access point, the method comprising:
   determining whether the access point connected by the printing apparatus is an authentication-free access point or not;
   setting a predetermined security setting into the printing apparatus upon determination by the determination unit that the access point connected by the printing apparatus is an authentication-free access point, the predetermined security setting being a setting of at least prohibiting an external apparatus from acquiring management information managed by the printing apparatus,
   wherein, even if the predetermined security setting is set in the printing apparatus, the printing apparatus performs print processing on the basis of a print request received from the external apparatus.

7. A printing apparatus that performs wireless communication by establishing a connection to an access point, the printing apparatus comprising:
   a determination unit configured to determine whether the access point connected by the printing apparatus is an authentication-free access point or not; and
   a setting unit configured to set a predetermined security setting into the printing apparatus upon determination by the determination unit that the access point connected by the printing apparatus is an authentication-free access point, the predetermined security setting being a setting of at least prohibiting an external apparatus from changing management information managed by the printing apparatus,
   wherein, even if the predetermined security setting is set in the printing apparatus, the printing apparatus performs print processing on the basis of a print request received from the external apparatus.

8. The printing apparatus according to claim 7, wherein the management information is any one of department management information and telephone book information.

9. The printing apparatus according to claim 7, wherein the determination unit determines that the access point connected by the printing apparatus is an authentication-free access point in a case where the access point connected by the printing apparatus has been set not to perform encryption of data communication between the access point and the printing apparatus.

10. The printing apparatus according to claim 9, wherein the encryption conforms to an encryption scheme of any of WEP, WPA, and WPA2-PSK.

11. A method for controlling a printing apparatus that performs wireless communication by establishing a connection to an access point, the method comprising:
   determining whether the access point connected by the printing apparatus is an authentication-free access point or not; and
   setting a predetermined security setting into the printing apparatus upon determination by the determination unit that the access point connected by the printing apparatus is an authentication-free access point, the predetermined security setting being a setting of at least prohibiting an external apparatus from changing management information managed by the printing apparatus,
   wherein, even if the predetermined security setting is set in the printing apparatus, the printing apparatus performs print processing on the basis of a print request received from the external apparatus.

* * * * *